(12) United States Patent
Yang et al.

(10) Patent No.: US 10,165,217 B2
(45) Date of Patent: Dec. 25, 2018

(54) BACKLIGHT SOURCE CONTROL METHOD OF DISPLAY DEVICE, DISPLAY DEVICE AND STORAGE MEDIUM

(71) Applicants: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

(72) Inventors: Jia Yang, Shandong (CN); Yuxin Zhang, Shandong (CN); Shunming Huang, Shandong (CN)

(73) Assignees: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 212 days.

(21) Appl. No.: 14/547,508

(22) Filed: Nov. 19, 2014

(65) Prior Publication Data

US 2016/0063688 A1    Mar. 3, 2016

(30) Foreign Application Priority Data

Aug. 28, 2014  (CN) .......................... 2014 1 0432142
Aug. 28, 2014  (CN) .......................... 2014 1 0433098
Aug. 28, 2014  (CN) .......................... 2014 1 0438740

(51) Int. Cl.
G06T 5/10      (2006.01)
H04N 5/445     (2011.01)
G09G 3/34      (2006.01)

(52) U.S. Cl.
CPC ....... *H04N 5/44504* (2013.01); *G09G 3/3426* (2013.01); *G09G 2320/0646* (2013.01);
(Continued)

(58) Field of Classification Search
CPC .. G09G 3/36; G09G 5/02; G09G 5/10; G09G 3/34326; G09G 2320/0646;
(Continued)

(56) References Cited

U.S. PATENT DOCUMENTS

2005/0094033 A1*  5/2005  Schoner ............... H04N 7/0122
                                                348/558
2009/0097774 A1*  4/2009  Harris .................... G09G 5/363
                                                382/266

(Continued)

FOREIGN PATENT DOCUMENTS

CN        101222810        7/2008

*Primary Examiner* — Lun-Yi Lao
*Assistant Examiner* — Johny Lau
(74) *Attorney, Agent, or Firm* — Boyle Fredrickson, S.C.

(57) ABSTRACT

One or more embodiments of the present application disclose a backlight source control method of a display device, the display device and a storage medium. The method includes: determining a display subregion corresponding to a backlight source to be turned off; determining a first backlight source brightness value of an adjacent display subregion of the display subregion corresponding to the backlight source to be turned off; lowering the first backlight source brightness value to obtain a second backlight source brightness value; and setting the backlight source brightness value corresponding to the adjacent display subregion to be the second backlight source brightness value.

20 Claims, 6 Drawing Sheets

(52) U.S. Cl.
CPC . *G09G 2320/0686* (2013.01); *G09G 2360/16* (2013.01); *H04N 2005/44526* (2013.01)

(58) Field of Classification Search
CPC ........ G09G 2320/0686; G09G 2360/16; G06T 5/10; G06K 9/40; H04N 5/14; H04N 5/445; H04N 5/46; H04N 5/44504; H04N 2005/44526

See application file for complete search history.

(56) References Cited

U.S. PATENT DOCUMENTS

| | | | | |
|---|---|---|---|---|
| 2009/0115907 | A1* | 5/2009 | Baba | G09G 3/3406 348/672 |
| 2010/0194791 | A1* | 8/2010 | Ogi | G06T 5/40 345/691 |
| 2011/0279482 | A1* | 11/2011 | Neal | G09G 3/3426 345/690 |
| 2011/0285764 | A1* | 11/2011 | Kimura | G09G 3/3426 345/697 |
| 2012/0319936 | A1* | 12/2012 | Tanaka | G09G 3/3426 345/102 |

* cited by examiner

| | |
|---|---|
| 1 | 9 |
| 2 | 10 |
| 3 | 11 |
| 4 | 12 |
| 5 | 13 |
| 6 | 14 |
| 7 | 15 |
| 8 | 16 |

Fig.3

| | |
|---|---|
| 1 | 9 |
| 2 | 10 |
| 3 | 11 |
| 4 | 12 |
| 5 | 13 |
| 6 | 14 |
| 7 | 15 |
| 8 | 16 |

Fig.4

BACKLIGHT SOURCE CONTROL METHOD OF DISPLAY DEVICE, DISPLAY DEVICE AND STORAGE MEDIUM

CROSS-REFERENCES TO RELATED APPLICATIONS

The present application claims priorities from Chinese Patent Application No. 201410438740.3, Chinese Patent Application No. 201410433098.X and Chinese Patent Application No. 201410432142.5, which are all filed with the Chinese Patent Office on Aug. 28, 2014 and hereby incorporated by reference in their entireties.

FIELD

The disclosure relates to the field of backlight source control, and in particular to a backlight source control method of a display device, the display device and a storage medium.

BACKGROUND

A liquid crystal display device is a passive light emitting element, a display screen itself does not emit light, image display depends on a persistent backlight source provided by a backlight module in the liquid crystal display device, the light emitted from the backlight source is transmitted out of the liquid crystal screen through turn-on and turn-off of liquid crystal molecules, and the image display is finally realized. The backlight source and the liquid crystal display screen are combined together to form a liquid crystal display module. For example, in some liquid crystal display devices having a certain structure, a light source, an optical diaphragm and the like form a backlight source of a liquid crystal display; when the light emitted from the backlight source is irradiated onto a liquid crystal panel, the light is transmitted upwards through a lower polarizer, different liquid crystal panels would change the polarizing direction of the light according to their own mechanisms at this moment, and then the light is in contact with a color filter to produce colors and finally enters an upper polarizer; and after the polarizing direction is changed by the liquid crystal, one part of the light may be emitted out, the other part of the light is absorbed, and each pixel on the whole liquid crystal panel may decide respectively the intensity of the emergent light, so that an image is produced.

SUMMARY

One or more embodiments of the disclosure provide a backlight source control method of a display device, the display device and a storage medium.

At one aspect, one or more embodiments of the disclosure provide a backlight source control method of a display device, which includes:

determining a display subregion corresponding to a backlight source to be turned off;

determining a first backlight source brightness value of an adjacent display subregion of the display subregion corresponding to the backlight source to be turned off;

lowering the first backlight source brightness value to obtain a second backlight source brightness value;

setting the backlight source brightness value corresponding to the adjacent display subregion to be the second backlight source brightness value.

At another aspect, one or more embodiments of the disclosure provide a display device, which includes:

a memory; and one or more processors, wherein the memory stores computer-readable program codes, and the one or more processors are used to execute the computer-readable program codes to implement:

determining a display subregion corresponding to a backlight source to be turned off;

determining a first backlight source brightness value of an adjacent display subregion of the display subregion corresponding to the backlight source to be turned off;

lowering the first backlight source brightness value to obtain a second back light source brightness value;

setting the backlight source brightness value corresponding to the adjacent display subregion to be the second backlight source brightness value.

Yet another aspect, one or more embodiments of the disclosure provide a storage medium storing computer-readable program codes, wherein the computer-readable program codes are executed by one or more processors to implement:

determining a display subregion corresponding to a backlight source to be turned off;

determining a first backlight source brightness value of an adjacent display subregion of the display subregion corresponding to the backlight source to be turned off;

lowering the first backlight source brightness value to obtain a second backlight source brightness value;

setting the backlight source brightness value corresponding to the adjacent display subregion to be the second backlight source brightness value.

BRIEF DESCRIPTION OF THE DRAWINGS

FIG. 3 shows a display screen division manner adopted in the 1D or 1.5D local dimming technology;

FIG. 4 is a schematic diagram of displaying a image in a wide-screen film display mode in a display screen in one or more embodiments;

DETAILED DESCRIPTION OF THE EMBODIMENTS

In order to make the purposes, technical solutions and advantages of one or more embodiments of the disclosure clearer, the disclosure will be further described below in combination with the accompanying drawings. Apparently, the embodiments described are merely a part, but not all, of the embodiments of the disclosure. All the other embodiments, obtained by those ordinary skilled in the art based on the embodiments of the disclosure without any creative effort, fall into the protection scope of the disclosure.

When a display screen of a display device displays an image, a backlight module is required to provide a persistent backlight source for the display screen. Besides providing the backlight source, the backlight module may further adjust the brightness of the backlight source, for example, the backlight module may adjust the brightness of the backlight source according to the required brightness of the image to be displayed. The display screen in the embodiments of the disclosure may be an LCD.

One or more embodiments of the disclosure provide a backlight source control method of a display device, the display device and a storage medium.

Some embodiments of the disclosure will be described below in combination with the accompanying drawings.

Figure 1:
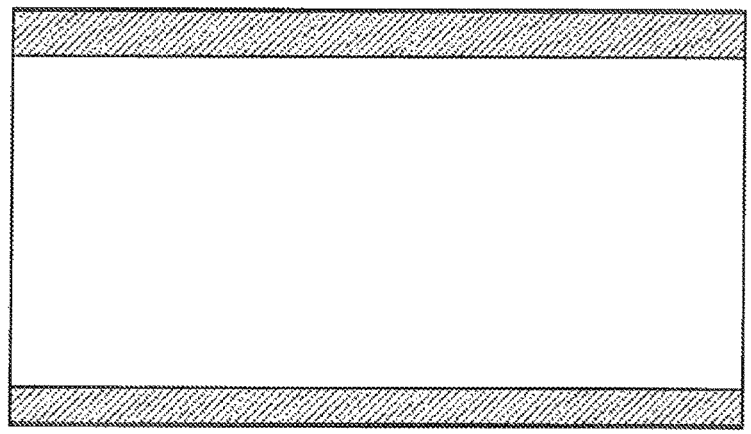
FIG. 1 is a schematic diagram of displaying an image with black regions in a display screen.
Figure 2:
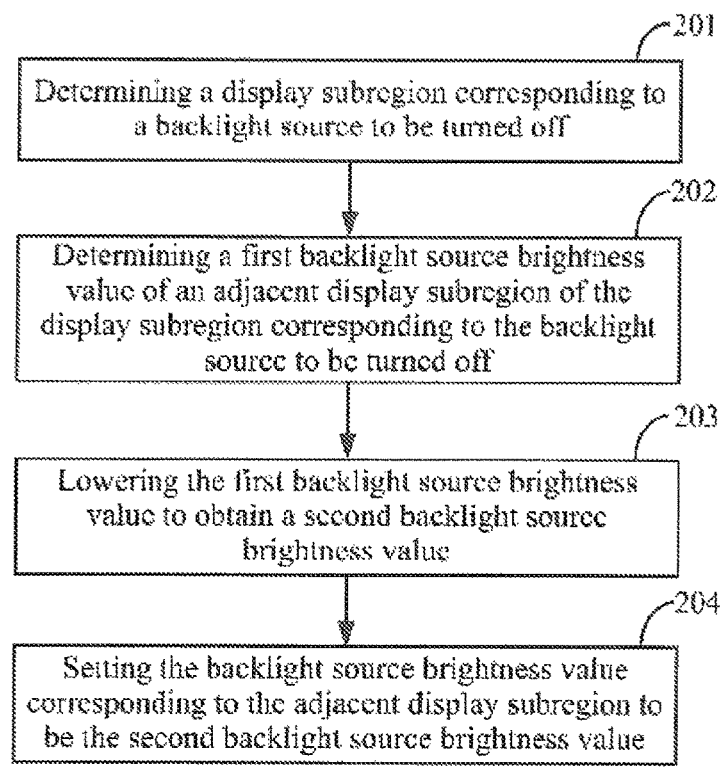
FIG. 2 is a flow chart of a backlight source control method of a display device according to one or more embodiments of the disclosure.

As shown in FIG. 2, which is a flow chart of a backlight source control method of a display device according to one or more embodiments of the disclosure, the method includes:

operation 201: determining a display subregion corresponding to a backlight source to be turned off;

operation 202: determining a first backlight source brightness value of an adjacent display subregion of the display subregion corresponding to the backlight source to be turned off;

operation 203: lowering the first backlight source brightness value to obtain a second backlight source brightness value;

operation 204: setting the backlight source brightness value corresponding to the adjacent display subregion to be the second backlight source brightness value.

It should be noted that the operation 201 may be performed when an image to be displayed starts to be displayed on the display screen of the display device, or may be performed when the image to be displayed will be displayed on the display screen of the display device, or may be performed when the image to be displayed has been displayed on the display screen of the display device.

The backlight sources of the display screen may be divided into a plurality of small groups of backlight sources through the local dimming technology, a small group of backlight sources may be also named as a backlight subregion, and the display screen region corresponding to each small group of backlight sources is called one display subregion. Each display screen may be divided into a plurality of display subregions, where each display subregion may be controlled by a separate backlight subregion. For example, in one or more embodiments, as shown in FIG. 3, the display screen may be divided into 16 display subregions, including display subregions 1-16. Of course, in one or more other embodiments, the display screen may be divided into another number of display subregions.

In one or more embodiments, when the image is displayed in the display screen of the display device, the image may merely occupy a part of the display screen. At this moment, the backlight sources corresponding to the parts of display screen, which are not occupied by the image, may be turned off.

In the operation 201, the display subregion corresponding to the backlight source to be turned off may be determined according to specific situations. For example, the display subregion corresponding to the backlight source to be turned off may be located in a predetermined region of the display screen, and as shown in FIG. 3, the display subregions corresponding to the backlight sources to be turned off may be located at the top and/or bottom of the display screen or on the left side and/or right side of the display screen. Of course, the display subregion corresponding to the backlight source to be turned off may also be located in another region of the display screen.

In the operation 203, the first backlight source brightness value may be lowered to obtain the second backlight source brightness value in multiple manners, for example, in one or more embodiments, the following manner may be adopted:

obtaining a backlight source weight value corresponding to the first backlight source brightness value according to a mapping relation between backlight source brightness values and backlight source weight values; and multiplying the backlight source weight value by the first backlight source brightness value to obtain the second backlight source brightness value, where the backlight source weight value may be greater than 0 and less than 1.

Of course, the first backlight source brightness value may also be lowered to obtain the second backlight source brightness value in other manners.

One or more embodiments of the disclosure may achieve the following technical effects: the light leak influence on the display subregion, of which the backlight source has been turned off, may be reduced by lowering the backlight source brightness value of the adjacent display subregion. However the first backlight source brightness value of the adjacent display subregion is determined according to the pixels of the image when the image is displayed in the adjacent display subregion, and therefore, if the first backlight source brightness value is adjusted to be too low, the display effect of the adjacent display subregion would be affected. The manner of setting a backlight source weight value for each backlight source brightness value may be used to lower the first backlight source brightness value of the adjacent display subregion and also reduce the influence on the displayed image as much as possible.

In one or more embodiments of the disclosure, the display screen may display an image in multiple manners, such as a wide-screen film display mode, a liquid crystal television display mode or other display mode or the like. The length-width ratio of the display screen in different display modes generally varies, for example, the length-width ratio of the display screen in the liquid crystal television display mode may be 16:9 or another ratio; and the length-width ratio of the display screen in the wide-screen film display mode may be 21:9 or another ratio.

In one or more embodiments of the disclosure, it is taken as an example for description that the display screen displays the image in the wide-screen film display mode. Of course, the following schemes are applicable to not only the wide-screen film display mode but also other display modes.

In one or more embodiments, the image in the wide-screen film display mode has two characteristics: only black pictures are displayed in the first region at the uppermost part of the image; and when black pictures are displayed in the second region at the lowermost part of the image, subtitles may also be displayed in the second region, where the color of the subtitles is generally white, and of course, may also be another color. For example, the length direction of the first region may extend along the length direction of the display screen, the width direction of the first region may extend along the width direction of the display screen, and the width of the first region may be not larger than a half of the width of the display screen; the length direction of the second region may extend along the length direction of the display screen, the width direction of the second region may extend along the width direction of the display screen, and the width of the second region may be not larger than a half of the width of the display screen. At this moment, the wide-screen film display mode may be determined according to these characteristics. In one or more embodiments of the disclosure, it may be judged whether the image displayed in the display screen enters the wide-screen film display mode by adopting the following manners:

obtaining the gray-scale value of a first image displayed in the first region and the gray-scale value of a second image displayed in the second region in the image to be displayed, and if both the average gray-scale value of the first image in the first region and the average gray-scale value of the second image in the second region are smaller than a first threshold, determining that the image to be displayed is in the wide-screen film display mode when being displayed in the display screen, where the first threshold is generally determined according to actual conditions, e.g., the first threshold may be any value between 0 and 20;

alternatively, if the average gray-scale value of the first image in the first region is smaller than the first threshold and the proportion occupied by the pixels of which gray-scale values are 0 in the second image displayed in the second region at the bottom of the display screen is greater than a second threshold, determining that the image to be displayed is in the wide-screen film display mode when being displayed in the display screen, e.g., the value of the second threshold may be 80% to 100%.

After determining that the gray-scale value of the image to be displayed satisfies the condition of the wide-screen film display mode, it may be determined that the image to be displayed is displayed in the wide-screen film display mode.

In one or more embodiments, in order to improve the accuracy of judgment, on the basis that the image to be displayed satisfies the above condition, a judgment condition may also be added: determining whether the continuous N frames of images previous to the image to be displayed are all displayed in the wide-screen film display mode when being displayed in the display screen, if so, determining that the image to be displayed is displayed in the wide-screen film display mode in the display screen, where N is a positive integer, e.g., N is at least greater than 10.

In one or more embodiments, the display mode of the continuous N frames of images previous to the image to be displayed when being displayed may be determined by adopting the following manner:

obtaining the gray-scale values of pixels of first images and second images of the continuous N frames of images previous to the image to be displayed, where N is preset and is greater than 1;

determining that the continuous N frames of images are displayed in the wide-screen film display mode if the gray-scale values of all the pixels in the first image and the second image of each frame of image in the N frames of images all satisfy at least one of the following conditions:

the average gray-scale values of all the pixels in the first images and the second images of the N frames of images are all smaller than the first threshold; or the average gray-scale values of all the pixels in the first images of the N frames of images are smaller than the first threshold and the proportion occupied by the pixels of which the gray-scale values are 0 in the second image of at least one frame of image in the N frames of images is greater than the second threshold.

When each frame of image in the continuous N frames of images previous to the image to be displayed is in the wide-screen film display mode, and meanwhile the gray-scale values of the pixels of the image to be displayed also satisfy the condition of the wide-screen film display mode, it may be determined that the image to be displayed is displayed in the wide-screen film display mode.

In one or more embodiments, in order to further increase the processing speed, when it is detected whether the image displayed in the display screen is in the wide-screen film display mode, only a small part of the pixels of the image to be displayed in the preset display subregion may be obtained for judgement, e.g., the pixel gray-scale values of pixel rows may be extracted from the first image and the second image at intervals to judge whether the image displayed in the display screen is in the wide-screen film display mode.

Figure 5:
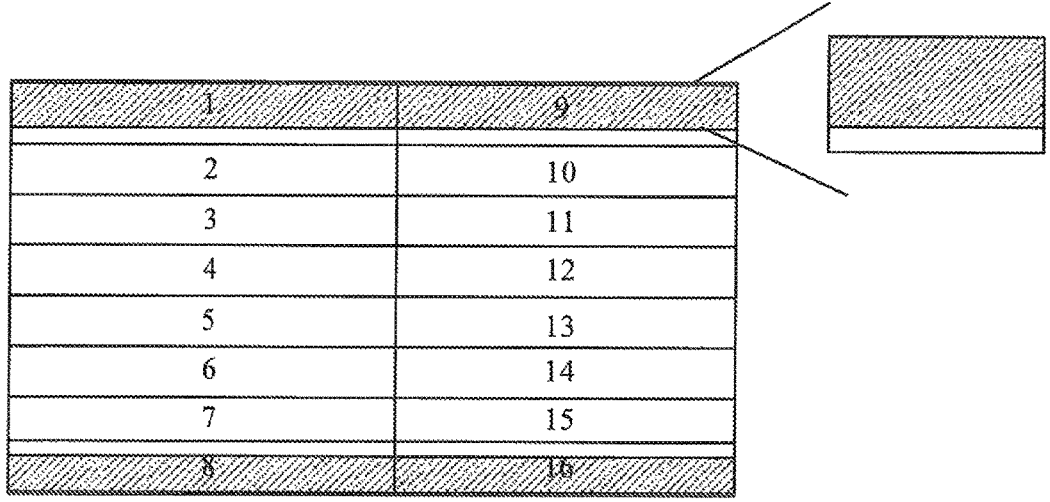
FIG. 5 is a schematic diagram of displaying the image in the wide-screen film display mode in a first region of the display screen in one or more embodiments.

After it is determined that the image to be displayed in the display screen is in the wide-screen film display mode, the backlight sources of a part of the display subregions of the display screen are turned off when the image in the wide-screen film display mode is displayed. In one or more embodiments, the specific backlight source, which is to be turned off when the image in the wide-screen film display mode is displayed, may be determined by adopting multiple manners, e.g., the following two manners:

As shown in FIG. 5, in the first situation, if the gray-scale values of the pixels of the image to be displayed in the display subregion of the first region are all 0, namely, all the pixels are black, the backlight source does not need to be turned on at this time. However, due to the presence of noise, the gray-scale values of some pixels are not 0, so in the embodiments of the disclosure, the event that the average gray-scale value of the pixels of the image to be displayed in the display subregion is smaller than the first threshold is used as a condition that the backlight source does not need to be turned on, e.g., the value of the first threshold is 0 to 20.

Figure 6:
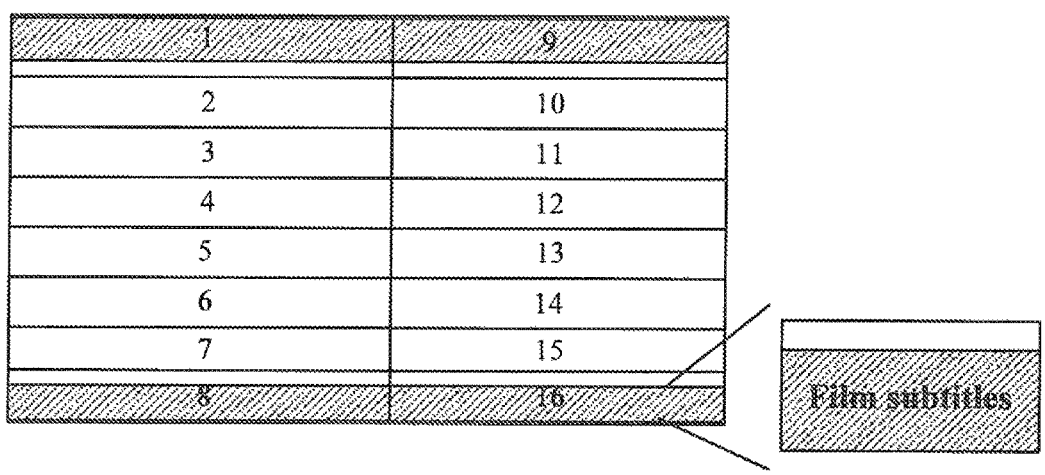
FIG. 6 is a schematic diagram of displaying the image in the wide-screen film display mode in a second region of the display screen in one or more embodiments.

In the second situation, no subtitles are displayed in the display subregion of the second region. According to the characteristic of the gray-scale values of the pixels of the image when the subtitles are displayed, it is determined whether subtitles are displayed in the second region. As shown in FIG. 6, when the subtitles are displayed in the display subregion of the second region, the gray-scale values of the pixels of the image to be displayed in the display subregion are mainly 0, and the gray-scale values of a part of the pixels are a first gray-scale value, where the first gray-scale value is generally 255. Thus, it is judged whether subtitles are displayed in the second region by adopting the following manner: if the gray-scale value of at least one pixel in at least one row of image pixels of the second image is the first gray-scale value, it is determined that the subtitles are displayed in the second region, where the first gray-scale value is 255. When the display subregion of the second region does not satisfy the above condition, it may be determined that no subtitles are displayed in the second region, and the backlight source of the display subregion may be turned off.

In order to weaken the light diffusion of the adjacent display subregion of the display subregion, the backlight source brightness value of the adjacent display subregion may be adjusted in one or more embodiments of the disclosure. For example, after it is determined that the image to be displayed in the display screen is displayed in the wide-screen film display mode and the backlight sources of the display subregions corresponding to the first region and the second region of the display screen are turned off the first backlight source brightness value of the adjacent display subregions of the display subregions corresponding to the first region and the second region of the display screen is determined; the first backlight source brightness value is lowered to obtain the second source backlight brightness value; and when the image to be displayed is displayed on the display screen, the backlight source brightness values of the adjacent display subregions are set to be the second backlight source brightness value.

The light leak influence on the display subregion, of which the backlight source has been turned off, may be reduced by lowering the backlight source brightness value of the adjacent display subregion. However the first backlight source brightness value of the adjacent display subregion is determined according to the pixels of the image when the image is displayed in the adjacent display subregion, and therefore, if the first backlight source brightness value is adjusted to be too low, the display effect of the adjacent display subregion would be affected. In one or more embodiments, the manner of setting a backlight source weight value for each backlight source brightness value may be used to lower the first backlight source brightness value of the adjacent display subregion and also reduce the influence on the displayed image as much as possible.

For example, the backlight source weight value corresponding to the first backlight source brightness value may be obtained according to the mapping relation between the backlight source brightness values and the backlight source weight values; and then the backlight source weight value is multiplied by the first backlight source brightness value to obtain the second backlight source brightness value, where the backlight source weight value may be greater than 0 and less than 1.

When the backlight source weight value is the one from 0 to 1, the weighted backlight source brightness value is smaller than the original backlight source brightness value. Since the weighted backlight source brightness value becomes smaller, the influence of the diffusion to the surrounding regions also becomes smaller. The adjacent display subregions of the display subregion, of which the backlight source is turned off are processed in this method, to thereby weaken the light leak phenomenon due to the light diffusion of the backlight sources of the adjacent display subregions.

In addition, the backlight source weight value may alternatively be greater than 1, and at this time the weighted backlight source brightness value will become greater, so that the saturation degree of the displayed image may be improved.

The mapping relation between the backlight source brightness values and the backlight source weight values may be realized in a preset manner or an experimental manner. Data of light diffusion of the backlight source at different brightness values is obtained through experiments, and the corresponding backlight source weight values are set for the different backlight source brightness values according to the data of light diffusion.

In one or more embodiments, the mapping relation between the backlight source brightness values and the backlight source weight values may be determined in the following experimental manner: in the darkroom environment, the backlight sources of respective display subregions are turned on sequentially, the data of light diffusion under different backlight source brightness values is obtained, and finally the fitting function of the backlight source brightness values and the data of light diffusion is obtained. Different backlight source weight values are set for different backlight source brightness values according to the fitting function; when the light diffusion degree is high, the backlight source weight value of the corresponding backlight source brightness value is set to be smaller; and when the light diffusion degree is low, the backlight source weight value of the corresponding backlight source brightness value is set to be larger. The specific settings are based on actual measurements.

In one or more embodiments of the disclosure, the display subregion corresponding to the backlight source to be turned off may be determined in the following manners:

First manner: determining whether the image to be displayed is displayed in the wide-screen film mode in the display screen, if so, turning off the backlight source corresponding to the display subregion in the first region of the display screen; or Second manner: determining whether subtitles are displayed in the second region of the display screen, if not, turning off the backlight source corresponding to the display subregion in the second region.

In the two manners described above, the first region is located at the top of the display screen, and the second region is located at the bottom of the display screen. In one or more embodiments, any one of the two manners may be performed separately; and in one or more other embodiments, both the two manners may be performed simultaneously, and the performing sequence is not limited.

In one or more embodiments of the disclosure, it may be determined that the image is displayed in the wide-screen film display mode in the following manner:

firstly, obtaining the image to be displayed, and determining a first image displayed in the first region of the display screen and a second image displayed in the second region of the display screen in the image to be displayed, where the first region is located at the top of the display screen, and the second region is located at the bottom of the display screen;

secondly, obtaining the gray-scale values of pixels in the first image and the second image; and finally, if both the average gray-scale value of all the pixels in the first image and the average gray-scale value of all the pixels in the second image are smaller than the first threshold, determining that the image to be displayed is displayed in the wide-screen film display mode; or, if the average gray-scale value of all the pixels in the first image is smaller than the first threshold and the proportion occupied by the pixels of which the gray-scale values are 0 in the second image is greater than the second threshold, determining that the image to be displayed is displayed in the wide-screen film display mode.

Figure 7:
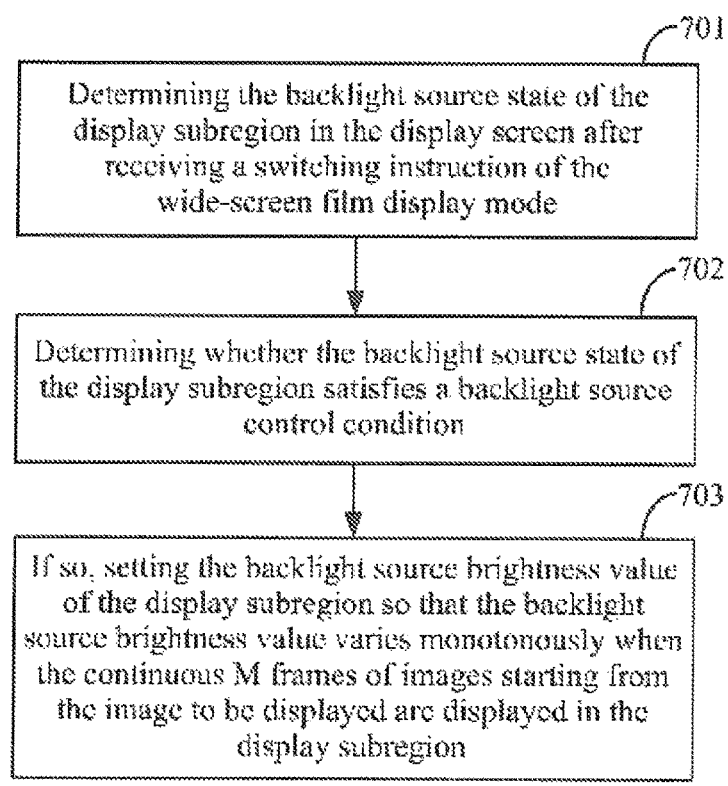
FIG. 7 is a flow chart of a backlight source control method in the process of entering or exiting from the wide-screen film display mode.

In addition, one or more embodiments of the disclosure further provide a backlight source control method in the process of entering or exiting from the wide-screen film display mode, and as shown in FIG. 7, the method may include:

operation 701: determining the backlight source state of the display subregion in the display screen after receiving a switching instruction of the wide-screen film display mode;

operation 702: determining whether the backlight source state of the display subregion satisfies a backlight source control condition;

operation 703: if so, setting the backlight source brightness value of the display subregion so that the backlight source brightness value varies monotonously when the continuous M frames of images starting from the image to be displayed are displayed in the display subregion.

In the operation 701, the display subregion may be the display subregion corresponding to the black region in the wide-screen film display mode in the display screen, and the backlight source state may be the backlight source turn-on state or the backlight source turn-off state. In the operation 703, M may be a positive integer greater than 0.

If the switching instruction of the wide-screen film display mode is received for multiple times within a short time period, the backlight source state of the display subregion, where the region displaying fixedly black pictures is located when the images in the wide-screen film display mode are displayed, is changed for multiple times. The backlight source state may comprise the backlight source turn-on state or the backlight source turn-off state, and at this moment, the backlight source are turned on and off continuously to produce the flicker phenomenon which will bring great stimulation to the vision of a viewer. For example, there are continuous five frames of images, the backlight source states required by the display subregion, where the region displaying fixedly black pictures is located when the images in the wide-screen film display mode are displayed, are respectively as follows: the backlight source turn-on state, the backlight source turn-off state, the backlight source turn-on state, the backlight source turn-off state and the backlight source turn-on state.

In one or more embodiments of the disclosure, the flicker phenomenon may be avoided in the manner of delaying turning off or on the backlight source. After the switching instruction of the wide-screen film display mode is received, firstly the backlight source state of the display subregion in the display screen is determined, and then it is determined whether the backlight source state of the display subregion satisfies the backlight source control condition, for example, it is judged whether the backlight source state of the display subregion is identical to the backlight source state when a frame of image previous to the image to be displayed is displayed in the display subregion; if not, it is determined that the backlight source state of the display subregion satisfies the backlight source control condition.

After it is determined that the backlight source state of the display subregion satisfies the backlight source control condition, the backlight source brightness value of the display subregion is set so that the backlight source brightness value varies monotonously when continuous M frames of images starting from the image to be displayed are displayed in the display subregion, where M may be a positive integer greater than 0.

There are two situations where the backlight source brightness value in the display subregion varies monotonously. In the first situation, when the instruction of switching from the non wide-screen film display mode to the wide-screen film display mode is received, the regions, where the display subregions of which the backlight sources need to be turned off in the wide-screen film display mode are located, are determined. The backlight sources corresponding to the display subregions in the first region definitely need to be turned off and then it is judged whether subtitles are displayed in the second region, if not, the backlight sources corresponding to the display subregions in the second region are turned off. At this moment, the backlight sources are not turned off immediately, but are turned off after the M frames of images are delayed, and meanwhile, the backlight source brightness values of the delayed M frames of images in display are set so that the backlight source brightness values of the delayed M frames of images are decreased monotonously according to the time sequence of displaying the images. In the monotonous change, the backlight source brightness value when the frame of image previous to the image to be displayed is displayed is used as the initial backlight source brightness value.

In one or more embodiments, the backlight source brightness values of the delayed M frames of images constitute an arithmetic progression. If it is determined that the backlight source is turned off when the image to be displayed is displayed, and the backlight source of the display subregion is not turned off or the backlight source brightness value thereof is not 0 when the previous frame of image is displayed, then when the delayed M frames of images are displayed, the backlight source brightness values of the M frames of images constitute the arithmetic progression, where the backlight source brightness value of the display subregion when the previous frame of image is displayed serves as the first term and negative one Mth of the backlight source brightness value of the display subregion when the previous frame of image is displayed serves as the common difference. After the M frames are delayed, the backlight source is turned off when the (M+1)th frame of image is displayed. For example, the backlight source brightness value of the display subregion when the previous frame of image is displayed is 9 and three frames of images need to be delayed, and thus the backlight source is not turned off when the image to be displayed is displayed, but the backlight source brightness value thereof is 9 instead. At this moment, the first term is 9, the common difference is 3, the backlight source brightness value of the delayed second frame of image is 6, the backlight source brightness value of the delayed third frame of image is 3, and finally the backlight source is turned off when the fourth frame of image is displayed.

In the second situation, when the instruction of switching from the wide-screen film display mode to the non wide-screen film display mode is received, the regions, where the display subregions of which the backlight sources need to be turned on in the non wide-screen film display mode are located, are determined. The backlight sources corresponding to the display subregions in the first region definitely need to be turned on, and then it is judged whether subtitles are displayed in the second region, if not, the backlight sources corresponding to the display subregions in the second region are turned on. At this moment, the backlight sources are not turned on immediately, but after M frames of images are delayed, the backlight source brightness value required by the (M+1)th frame of image is set to be the backlight source brightness value required by the image to be displayed, and meanwhile, the backlight source brightness values of the delayed M frames of images in display are set so that the backlight source brightness values of the delayed M frames of images are increased monotonously according to the time sequence of displaying the images. In the monotonous change, the backlight source brightness value when the frame of image previous to the image to be displayed is displayed is used as the initial backlight source brightness value.

In one or more embodiments, when the delayed M frames of images are displayed, the backlight source brightness values of the M frames of images constitute an arithmetic progression, where 0 serves as the first term and one Mth of the backlight source brightness value required by the image to be displayed serves as the common difference. After the M frames are delayed, the backlight source brightness value when the (M+1)th frame of image is displayed is set to be the backlight source brightness value required by the image to be displayed. For example, the backlight source brightness value required by the image to be displayed is 9 and three frames of images need to be delayed, and thus the backlight source brightness value is 0 instead when the image to be displayed is displayed, and at this moment, the first term is 0, the common difference is 3, the backlight source brightness value of the delayed second frame of image is 3, the backlight source brightness value of the delayed third frame of image is 6, and finally the backlight source brightness value is set to be 9 when the fourth frame of image is displayed.

Figure 8:
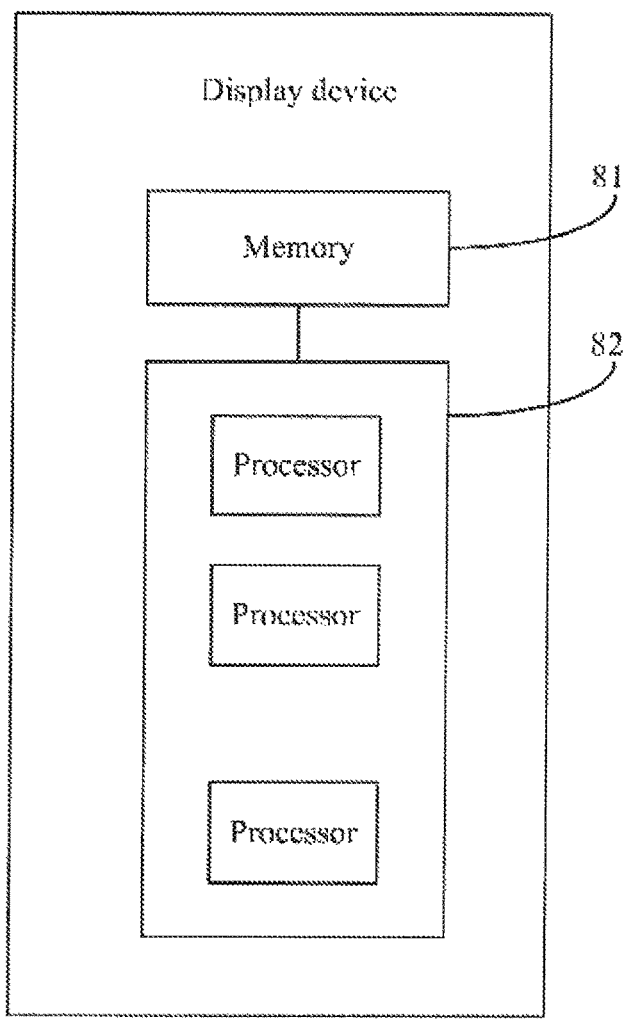
FIG. 8 is a structural schematic diagram of a display device in one or more embodiments of the disclosure.

One or more embodiments of the disclosure further provide a display device, and as shown in FIG. 8, the display device may include: a memory 81, and one or more processors 82, where the memory 81 may store computer-readable program codes, and the one or more processors 82 may be used to execute the computer-readable program codes to implement:

determining a display subregion corresponding to a backlight source to be turned off;

determining a first backlight source brightness value of an adjacent display subregion of the display subregion corresponding to the backlight source to be turned off;

lowering the first backlight source brightness value to obtain a second backlight source brightness value;

setting the backlight source brightness value corresponding to the adjacent display subregion to be the second backlight source brightness value.

It should be noted that the operation of determining the display subregion corresponding to the backlight source to be turned off may be performed when an image to be displayed starts to be displayed on the display screen of the display device, or may be performed when the image to be displayed will be displayed on the display screen of the display device, or may be performed when the image to be displayed has been displayed on the display screen of the display device.

In one or more embodiments, the operation of lowering the first backlight source brightness value to obtain the second backlight source brightness value may comprise:

obtaining a backlight source weight value corresponding to the first backlight source brightness value according to a mapping relation between backlight source brightness values and backlight source weight values;

multiplying the backlight source weight value by the first backlight source brightness value to obtain the second backlight source brightness value, where the backlight source weight value may be greater than 0 and less than 1.

In one or more embodiments, the display subregion corresponding to the backlight source to be turned off may be located in a predetermined region of the display screen.

In one or more embodiments, the operation of determining the display subregion corresponding to the backlight source to be turned off may comprise:

determining whether the image to be displayed is displayed in a wide-screen film mode in the display screen, if so, turning off a backlight source corresponding to a display subregion in a first region of the display screen;

determining whether subtitles are displayed in a second region of the display screen, if not, turning off a backlight source corresponding to a display subregion in the second region, where the first region may be located at the top of the display screen, and the second region may be located at the bottom of the display screen.

In one or more embodiments, the operation of determining whether the image to be displayed is displayed in the wide-screen film mode in the display screen may comprise:

obtaining the image to be displayed, and determining a first image displayed in the first region of the display screen and a second image displayed in the second region of the display screen in the image to be displayed;

obtaining gray-scale values of pixels in the first image and the second image;

if both an average gray-scale value of all pixels in the first image and an average gray-scale value of all pixels in the second image are smaller than a first threshold which may be greater than 0, or, if the average gray-scale value of all the pixels in the first image is smaller than the first threshold and a proportion occupied by pixels of which gray-scale values are 0 in the second image is greater than a second threshold which may be greater than 0; determining that the image to be displayed is displayed in the wide-screen film mode.

In one or more embodiments, the operation of obtaining the gray-scale values of the pixels in the first image and the second image may comprise:

extracting pixel gray-scale values of pixel rows from the first image and the second image at intervals.

In one or more embodiments, the operation of determining whether the subtitles are displayed in the second region may comprise:

if a gray-scale value of at least one pixel in at least one row of image pixels of the second region is a predetermined gray-scale value, determining that the subtitles are displayed in the second region.

In one or more embodiments, the computer-readable program codes may be further executed to implement:

determining a backlight source state corresponding to a display subregion in a predetermined region of the display screen, wherein the backlight source state comprises a backlight source turn-on state or a backlight source turn-off state;

determining whether the backlight source state of the display subregion in the predetermined region satisfies a backlight source control condition;

if so, setting a backlight source brightness value of the display subregion in the predetermined region so that the backlight source brightness value varies monotonously when continuous M frames of images starting from the image to be displayed are displayed in the display subregion, where M may be a positive integer greater than 0.

In one or more embodiments, the operation of determining whether the backlight source state of the display subregion satisfies the backlight source control condition may comprise:

judging whether the backlight source state of the display subregion is identical to the backlight source state when a frame of image previous to the image to be displayed is displayed in the display subregion;

if not, determining that the backlight source state of the display subregion satisfies the backlight source control condition.

For the corresponding contents, reference may be made to the description of the method, which will not be redundantly described herein.

Figure 9:
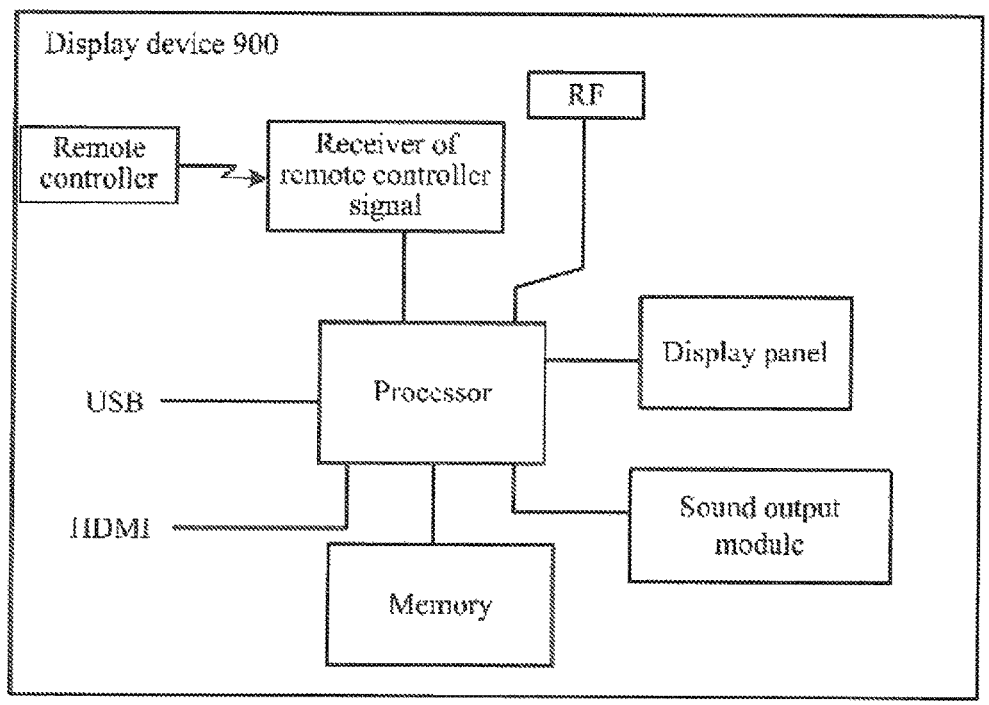
FIG. 9 is a structural schematic diagram of another display device in one or more embodiments of the disclosure.

In one or more embodiments, the display device may have a structure shown in FIG. 9. As shown in FIG. 9, the display device 900 may include a memory, an input unit, an output unit, one or more processors and other components. Those skilled in the art should understand that the structure of the display device shown in FIG. 9 does not limit the display device, and the display device may include more or less components as shown in the figure, or combine certain components, or have different component arrangement.

The memory may be used for storing software programs and modules, and the processor may run the software programs and the modules stored in the memory to thereby implement various functional applications and data processing. The memory may include a high-speed random access memory and may also include a nonvolatile memory, such as at least one magnetic disk storage device, a flash memory device or other volatile solid-state storage devices. In addition, the memory may also include a memory controller used to provide access of the processor and the input device to the memory.

The processor may be the control center of the display device 900, and may be connected with respective parts of the whole display device via various interfaces and circuits, runs or implements the software programs and/or the modules stored in the memory, invokes the data stored in the memory, implements the various functions of the display device 900 and processes data, to thereby monitor the display device in overall. Optionally, the processor may include one or more processing cores; and optionally, the processor may include an application processor and a modulation and demodulation processor, where the application processor is mainly used for processing the operating system, user interfaces, application programs and the like, and the modulation and demodulation processor is mainly used for processing wireless communications. It may be understood that the modulation and demodulation processor may not be integrated into the processor.

The display device 900 may include a television broadcast receiver, a high-definition multimedia interface, a USB port, an audio-video input structure and other input units. The input unit may further include a remote controller receiver for receiving signals transmitted from a remote controller. In addition, the input unit may further include a touch-sensitive surface and other input devices, where the touch-sensitive surface may be implemented in a variety of types, such as resistance type, capacitance type, infrared type, surface acoustic wave and the like; and other input devices may include but not limited to one or more of a physical keyboard, function keys (such as a volume control key, a switch key and the like), a track ball, a mouse, an operating rod and the like.

The output unit is configured to output sound signals, video signals, alarm signals, vibration signals and the like. The output unit may include a display panel, a sound output module and the like. The display panel may be configured to display information input by a user or information provided to the user and also to display various graphical user interfaces of the display device 900, where these graphical user interfaces may be composed of graphics, texts, icons, videos and any combination thereof. For example, the display panel may adopt an LCD (Liquid Crystal Display), an OLED (Organic Light-Emitting Diode), a flexible display, a three-dimensional display, a CRT, a plasma display panel and the like.

The display device 900 may further include at least one sensor (not shown in the figure), e.g., a light sensor, a motion sensor and other sensors. Specifically, the light sensor may comprise an ambient light sensor and a proximity sensor, where the ambient light sensor may regulate the brightness of the display panel according to the brightness of the ambient light, and the proximity sensor may close the display panel and/or backlight when the display device 900 is moved to a certain position. The display device 900 may further be equipped with a gyroscope, a barometer, a hygrometer, a thermometer, an infrared sensor and other sensors.

The display device 900 may further include an audio circuit (not shown in the figure), a speaker and a microphone, which may provide audio interfaces between the user and the display device 900. The audio circuit may convert the received audio data to electrical signals and then transmit the electrical signals to the speaker, and the speaker converts the electrical signals to sound signals for output; and on the other hand, the microphone converts the collected sound signals to electrical signals, the electrical signals are received and then converted to the audio data by the audio circuit, and then the audio data is output to the processor for processing and sent to another device, or the audio data is output to the memory to facilitate the further processing. The audio circuit may further comprise an earplug jack to provide communications between a peripheral earphone and the display device 900.

In addition, the display device 900 may further include an RF (Radio Frequency) circuit. The RF circuit may be used for receiving and transmitting signals. Generally, the RF circuit includes but not limited to an antenna, at least one amplifier, a tuner, one or more oscillators, a subscriber identity module (SIM) card, a transceiver, a coupler, an LNA (Low Noise Amplifier), a diplexer and the like. In addition, the display device 900 may further include a camera, a Bluetooth module and the like.

Moreover, the display device 900 may further include a WiFi (Wireless Fidelity) module (not shown in the figure). WiFi belongs to a short-range wireless transmission technology, and the display device 900 may help the user to receive and send e-mails, browse web pages, access streaming media and the like, and provide wireless broadband Internet access for the user through the WiFi module. Although the WiFi module is shown in FIG. 9, it may be understood that the WiFi module does not belong to the necessary constitution component of the display device 900, and may be omitted as needed in the range of not changing the essence of the disclosure.

In addition, one or more embodiments of the disclosure provide a computer-readable storage medium, where the computer-readable storage medium may be the computer-readable storage medium contained in the memory in the embodiment, or may be the computer-readable storage medium which exists alone and is not assembled into the terminal. The computer-readable storage medium stores one or more programs (in one or more embodiments, the computer-readable storage medium may be one or more magnetic disc storage devices, a flash memory device or other non-volatile solid-state storage devices, a CD-ROM, an optical memory and the like), where the one or more programs are executed by one or more processors to implement the method described in any one of the above embodiments.

Those skilled in the art shall appreciate that the embodiments of the disclosure may be embodied as a method, a system or a computer program product. Therefore the disclosure may be embodied in the form of an all-hardware embodiment, an all-software embodiment or an embodiment of software and hardware in combination. Furthermore, the disclosure may be embodied in the form of a computer program product embodied in one or more computer useable storage mediums (including but not limited to a disk memory, a CD-ROM, an optical memory, etc.) in which computer useable program codes are contained.

The disclosure has been described with reference to flow charts and/or block diagrams of the method, the device (system) and the computer program product according to the embodiments of the disclosure. It shall be appreciated that respective flows and/or blocks in the flow charts and/or the block diagrams and combinations of the flows and/or the blocks in the flow charts and/or the block diagrams may be embodied in computer program instructions. These computer program instructions may be loaded onto a generalpurpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions may also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the disclosure.

Evidently those skilled in the art may make various modifications and variations to the disclosure without departing from the spirit and scope of the disclosure. Thus the disclosure is also intended to encompass these modifications and variations thereto so long as these modifications and variations come into the scope of the claims appended to the disclosure and their equivalents.

The invention claimed is:

1. A backlight source control method of a display device, comprising:
    obtaining an image to be displayed;
    determining a first sub-image of the image to be displayed on a first region of a display screen of the display device and determining a second sub-image of the image to be displayed on a second region of the display screen, wherein the first region is located at a top of the display screen and the second region is located at a bottom of the display screen;
    extracting pixel gray-scale values of pixel rows from the first sub-image at intervals and extracting pixel gray-scale values of pixel rows from the second sub-image at intervals; and
    if both an average gray-scale value of all the extracted pixels in the first sub-image and an average gray-scale value of all the extracted pixels in the second sub-image are smaller than a first threshold, or, if the average gray-scale value of all the extracted pixels in the first sub-image is smaller than the first threshold and a proportion occupied by pixels of which gray-scale values are 0 in the second sub-image is greater than a second threshold, determining that the image to be displayed is displayed in a wide-screen film mode; wherein the first threshold is greater than 0 and the second threshold is greater than 0;
    in response to the image to be displayed is displayed in the wide-screen film node on the display screen, turning off a backlight source corresponding to a display subregion in a first region of the display screen;
    determining a first backlight source brightness value of an adjacent display subregion of the display subregion in the first region corresponding to the backlight source to be turned off; and setting the backlight source brightness value corresponding to the adjacent display subregion to be a second backlight source brightness value obtained by lowering the first backlight source brightness to reduce light leaking to the display subregion in the first region corresponding to the backlight source to be turned off.

2. The method of claim 1, wherein lowering the first backlight source brightness value to obtain the second backlight source brightness value comprises:
    obtaining a backlight source weight value corresponding to the first backlight source brightness value according to a mapping relation between backlight source brightness values and backlight source weight values; and
    multiplying the backlight source weight value by the first backlight source brightness value to obtain the second backlight source brightness value, wherein the backlight source weight value is greater than 0 and less than 1.

3. The method of claim 1, further comprising:
    determining whether subtitles are displayed on the second region of the display screen; and
    in response to the subtitles not being displayed on the second region of the display screen, turning off a backlight source corresponding to a display subregion in the second region.

4. The method of claim 3, further comprising:
    in response to the subtitles not being displayed on the second region of the display screen, determining a third backlight source brightness value of an adjacent display subregion of the display subregion in the second region corresponding to the backlight source to be turned off; and
    setting the backlight source brightness value corresponding to the adjacent display subregion to be a fourth backlight source brightness value obtained by lowering the third backlight source brightness to reduce light leaking to the display subregion in the second region corresponding to the backlight source to be turned off.

5. The method of claim 3, wherein determining whether the subtitles are displayed on the second region comprises:
    if a gray-scale value of at least one pixel in at least one row of image pixels of the second region is a predetermined gray-scale value, determining that the subtitles are displayed on the second region.

6. The method of claim 1, further comprising:
    determining a first backlight source state of a display subregion in a predetermined region of the display screen, wherein the first backlight source state comprises a backlight source turn-on state or a backlight source turn-off state and corresponds to time after reception of an instruction for entering into or exiting the wide-screen film mode;
    determining whether the first backlight source state satisfies a backlight source control condition; and
    if the first backlight source state satisfies the backlight source control condition, setting a backlight source brightness value of the display subregion in the predetermined region so that the backlight source brightness value varies monotonically when M continuous frames of images starting from the image to be displayed are displayed in the display subregion in the predetermined region, wherein M is a positive integer.

7. The method of claim 6, wherein determining whether the first backlight source state satisfies the backlight source control condition comprises:

judging whether the first backlight source state is identical to a second backlight source state of the display subregion in the predetermined region, wherein the second backlight source state corresponds to time when a frame of image previous to the image to be displayed is displayed in the display subregion in the predetermined region; and if the first backlight source state is not identical to the second backlight source state, determining that the first backlight source state satisfies the backlight source control condition.

8. A display device, comprising:
a memory; and
one or more processors,
wherein the memory stores computer-readable program codes, and the one or more processors are configured to execute the computer-readable program codes to implement:

obtaining an image to be displayed;

determining a first sub-image of the image to be displayed on a first region of a display screen of the display device and determining a second sub-image of the image to be displayed on a second region of the display screen, wherein the first region is located at a top of the display screen and the second region is located at a bottom of the display screen;

extracting pixel gray-scale values of pixel rows from the first sub-image at intervals and extracting pixel gray-scale values of pixel rows from the second sub-image at intervals; and if both an average gray-scale value of all the extracted pixels in the first sub-image and an average gray-scale value of all the extracted pixels in the second sub-image are smaller than a first threshold, or, if the average gray-scale value of all the extracted pixels in the first sub-image is smaller than the first threshold and a proportion occupied by pixels of which gray-scale values are 0 in the second sub-image is greater than a second threshold, determining that the image to be displayed is displayed in a wide-screen film mode; wherein the first threshold is greater than 0 and the second threshold is greater than 0;

in response to the image to be displayed is displayed in the wide-screen film mode on the display screen, turning off a backlight source corresponding to a display subregion in a first region of the display screen;

determining a first backlight source brightness value of an adjacent display subregion of the display subregion in the first region corresponding to the backlight source to be turned off; and setting the backlight source brightness value corresponding to the adjacent display subregion to be a second backlight source brightness value obtained by lowering the first backlight source brightness to reduce light leaking to the display subregion in the first region corresponding to the backlight source to be turned off.

9. The display device of claim 8, wherein the one or more processors are further configured to execute the computer-readable program codes to implement:

obtaining a backlight source weight value corresponding to the first backlight source brightness value according to a mapping relation between backlight source brightness values and backlight source weight values; and multiplying the backlight source weight value by the first backlight source brightness value to obtain the second backlight source brightness value, wherein the backlight source weight value is greater than 0 and less than 1.

10. The display device of claim 8, wherein the one or more processors are further configured to execute the computer-readable program codes to implement:

determining whether subtitles are displayed on the second region of the display screen; and in response to the subtitles not being displayed on the second region of the display screen, turning off a backlight source corresponding to a display subregion in the second region.

11. The display device of claim 10, wherein the one or more processors are further configured to execute the computer-readable program codes to implement:

in response to the subtitles not being displayed on the second region of the display screen, determining a third backlight source brightness value of an adjacent display subregion of the display subregion in the second region corresponding to the backlight source to be turned off; and setting the backlight source brightness value corresponding to the adjacent display subregion to be a fourth backlight source brightness value obtained by lowering the third backlight source brightness to reduce light leaking to the display subregion in the second region corresponding to the backlight source to be turned off.

12. The display device of claim 10, wherein the one or more processors are further configured to execute the computer-readable program codes to implement:

if a gray-scale value of at least one pixel in at least one row of image pixels of the second region is a predetermined gray-scale value, determining that the subtitles are displayed on the second region.

13. The display device of claim 8, wherein the one or more processors are further configured to execute the computer-readable program codes to implement:

determining a first backlight source state of a display subregion in a predetermined region of the display screen, wherein the first backlight source state comprises a backlight source turn-on state or a backlight source turn-off state and corresponds to time after reception of an instruction for entering into or exiting the wide-screen film mode;

determining whether the first backlight source state satisfies a backlight source control condition; and if the first backlight source state satisfies the backlight source control condition, setting a backlight source brightness value of the display subregion in the predetermined region so that the backlight source brightness value varies monotonically when M continuous frames of images starting from the image to be displayed are displayed in the display subregion in the predetermined region, wherein M is a positive integer.

14. The display device of claim 13, wherein the one or more processors are further configured to execute the computer-readable program codes to implement:

judging whether the first backlight source state is identical to a second backlight source state of the display subregion in the predetermined region, wherein the second backlight source state corresponds to time when a frame of image previous to the image to be displayed is displayed in the display subregion in the predetermined region; and if the first backlight source state is not identical to the second backlight source state, determining that the first backlight source state satisfies the backlight source control condition.

15. A non-transitory storage medium storing computer-readable program codes, wherein the computer-readable program codes are executed by one or more processors to implement:

obtaining an image to be displayed;

determining a first sub-image of the image to be displayed on a first region of a display screen of a display device and determining a second sub-image of the image to be displayed on a second region of the display screen, wherein the first region is located at a top of the display screen and the second region is located at a bottom of the display screen;

extracting pixel gray-scale values of pixel rows from the first sub-image at intervals and extracting pixel gray-scale values of pixel rows from the second sub-image at intervals; and if both an average gray-scale value of all the extracted pixels in the first sub-image and an average gray-scale value of all the extracted pixels in the second sub-image are smaller than a first threshold, or, if the average gray-scale value of all the extracted pixels in the first sub-image is smaller than the first threshold and a proportion occupied by pixels of which gray-scale values are 0 in the second sub-image is greater than a second threshold, determining that the image to be displayed is displayed in a wide-screen file mode; wherein the first threshold is greater than 0 and the second threshold is great than 0.

16. The non-transitory storage medium of claim 15, wherein the computer-readable program codes are further executed by one or more processors to implement:

in response to the image to be displayed is displayed in the wide-screen film mode on the display screen, turning off a backlight source corresponding to a display subregion in a first region of the display screen;

determining a first backlight source brightness value of an adjacent display subregion of the display subregion in the first region corresponding to the backlight source to be turned off; and setting the backlight source brightness value corresponding to the adjacent display subregion to be a second backlight source brightness value obtained by lowering the first backlight source brightness to reduce light leaking to the display subregion in the first region corresponding to the backlight source to be turned off.

17. The non-transitory storage medium of claim 16, wherein the computer-readable program codes are further executed by one or more processors to implement:

obtaining a backlight source weight value corresponding to the first backlight source brightness value according to a mapping relation between backlight source brightness values and backlight source weight values; and multiplying the backlight source weight value by the first backlight source brightness value to obtain the second backlight source brightness value, wherein the backlight source weight value is greater than 0 and less than 1.

18. The non-transitory storage medium of claim 16, wherein the computer-readable program codes are further executed by one or more processors to implement:

determining whether subtitles are displayed on the second region of the display screen; and in response to the subtitles not being displayed on the second region of the display screen, turning off a backlight source corresponding to a display subregion in the second region.

19. The non-transitory storage medium of claim 18, wherein the computer-readable program codes are further executed by one or more processors to implement:

if a gray-scale value of at least one pixel in at least one row of image pixels of the second region is a predetermined gray-scale value, determining that the subtitles are displayed on the second region.

20. The non-transitory storage medium of claim 16, wherein the computer-readable program codes are further executed by one or more processors to implement:

determining a first backlight source state of a display subregion in a predetermined region of the display screen, wherein the first backlight source state comprises a backlight source turn-on state or a backlight source turn-off state and corresponds to time after reception of an instruction for entering into or exiting the wide-screen film mode;

determining whether the first backlight source state satisfies a backlight source control condition; and if the first backlight source state satisfies the backlight source control condition, setting a backlight source brightness value of the display subregion in the predetermined region so that the backlight source brightness value varies monotonically when M continuous frames of images starting from the image to be displayed are displayed in the display subregion in the predetermined region, wherein M is a positive integer.

* * * * *